US011620059B1

(12) United States Patent
Patil et al.

(10) Patent No.: US 11,620,059 B1
(45) Date of Patent: Apr. 4, 2023

(54) OPTIMIZATION OF FILE SYSTEM SNAPSHOT PERFORMANCE IN HYBRID STORAGE DEPLOYMENTS

(71) Applicant: INTERNATIONAL BUSINESS MACHINES CORPORATION, Armonk, NY (US)

(72) Inventors: Sandeep Ramesh Patil, Pune (IN); Wei Gong, Beijing (CN); Smita J. Raut, Pune (IN); Sasikanth Eda, Vijayawada (IN); Gautam H. Shah, Shrewsbury, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/493,504

(22) Filed: Oct. 4, 2021

(51) Int. Cl.
G06F 3/06 (2006.01)

(52) U.S. Cl.
CPC ............ G06F 3/0619 (2013.01); G06F 3/064 (2013.01); G06F 3/065 (2013.01); G06F 3/0659 (2013.01); G06F 3/0683 (2013.01)

(58) Field of Classification Search
CPC ........ G06F 3/0619; G06F 3/064; G06F 3/065; G06F 3/0659; G06F 3/0683
See application file for complete search history.

(56) References Cited

U.S. PATENT DOCUMENTS

| 6,748,504 | B2  |   | 6/2004  | Sawdon et al. |
|-----------|-----|---|---------|-----------------------------|
| 9,952,783 | B2  | * | 4/2018  | Lu ................. G06F 16/33 |
| 10,007,559 | B1 | * | 6/2018  | Gaudlip .......... H04L 41/0896 |
| 10,235,064 | B1 |   | 3/2019  | Natanzon et al. |
| 10,649,696 | B2 | * | 5/2020  | Erdmann ........... G06F 3/0652 |
| 2015/0067231 | A1 | * | 3/2015 | Sundarrajan ........ G06F 3/065 711/103 |
| 2016/0359862 | A1 | * | 12/2016 | Riva ............ H04W 12/088 |
| 2018/0356989 | A1 |   | 12/2018 | Meister et al. |
| 2020/0314019 | A1 | * | 10/2020 | Rehman .......... H04L 47/808 |
| 2021/0019093 | A1 |   | 1/2021  | Karr et al. |

OTHER PUBLICATIONS

V. Dubeyko, "SSDFS: Towards LFS Flash-Friendly File System without GC Operations", arXiv: 1907.11825 [cs.OS], Jul. 27, 2019, pp. 52.
"ILM for snapshots", IBM Corporation, [online][retrieved Oct. 4, 2021] pp. 3, https://www.im.com/docs/en/spectrum-scale/5.0.5?topic=management-ilm-snapshos.

* cited by examiner

*Primary Examiner* — Eric Cardwell
(74) *Attorney, Agent, or Firm* — Konrad Raynes Davda & Victor LLP; Rabindranath Dutta

(57) ABSTRACT

A first set of applications that require a higher performance in comparison to a second set of applications are identified, and a first set of filesets corresponding to the first set of applications are identified. In response to a copy on write based snapshot operation with respect to the first set of filesets, blocks that are overwritten are stored in a first storage device that is of a higher performance in comparison to a second storage device.

18 Claims, 14 Drawing Sheets

OPTIMIZATION OF FILE SYSTEM SNAPSHOT PERFORMANCE IN HYBRID STORAGE DEPLOYMENTS

BACKGROUND

1. Field

Embodiments relate to an optimization of file system snapshot performance in hybrid storage deployments.

2. Background

A file system in a computational device manages how and where data on a storage disk is stored, accessed and managed. The file system is a logical disk component that manages a disk's internal operations as it relates to the computational device. There are several kinds of popular local file systems in different operating systems, and these file systems may manage data stored in a plurality of storage devices, such as, hard disk drives (HDD) or Non-Volatile Memory Express (NVMe) drives.

In computer systems, a snapshot is the state of a system at a particular point in time. The term was coined as an analogy to that in photography. A snapshot can refer to an actual copy of the state of a system or to a capability provided by certain systems. Many commercial enterprise level file systems provide snapshot capability. As the snapshot of a file system is a state at a point in time for a file system, a backup system may leverage this capability to backup the state of a file system. Some file systems have the capability to mount the snapshot, and then the end user may read and copy a file from the snapshot. As a result, the end user can read the file in the state when the snapshot had been created.

SUMMARY OF THE PREFERRED EMBODIMENTS

Provided are a method, system, and computer program product in which a first set of applications that require a higher performance in comparison to a second set of applications are identified, and a first set of filesets corresponding to the first set of applications are identified. In response to a copy on write based snapshot operation with respect to the first set of filesets, blocks that are overwritten are stored in a first storage device that is of a higher performance in comparison to a second storage device.

In additional embodiments, an identification is made of a second set of filesets corresponding to the second set of applications. In response to a copy on write based snapshot operation with respect to the second set of filesets, blocks that are written onto are stored in the second storage device.

In further embodiments, a background process is used to asynchronously demote blocks from the first storage device to the second storage device for storing relatively less data on the first storage device that has lower storage capacity relative to the second storage device.

In certain embodiments, the first storage device is a Non-volatile memory access (NVMe) storage drive, wherein the second storage device is a hard disk drive.

In further embodiments, in copy on write, a storage block is not copied during replication but a link maintained to an unmodified storage block, unless the storage block is overwritten.

In yet further components, in response to determining that no snapshot has been created for a selected fileset, processing an I/O to write the I/O on the second storage device.

In certain embodiments, an acknowledgement is provided in response to a write operation on a block, once the block has been copied to the first storage device.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In most file systems, a file hierarchy is represented as a series of directories that form a structure analogous to a tree. Each directory contains other directories, files, or other file-system objects, such as, symbolic links and hard links.

A file system object has a name associated with it, and is represented in the namespace as a node of the tree.

In addition, some file systems utilize a file system object called a fileset. A fileset is a subtree of a file system namespace that in many respects behaves like an independent file system. Filesets provide a means for partitioning the file system to allow administrative operations at a finer granularity than the entire file system. For example, independent snapshots for each fileset may be created. A popular usage for fileset is to isolate different kinds of workloads (such as workloads categorized based on different performance requirements) into separate filesets. File system administrators may apply different policies and attributes for these different filesets for different purposes. For example, a dedicated fileset may be created for a workload which has extremely high performance requirements in comparison to other workloads. In certain embodiments, the file system may assign superior resources, such as, relatively faster storage pools for improving performance.

Copy-on-Write (COW) [also written as "copy on write"], sometimes referred to as implicit sharing or shadowing, is a resource management technique used in computer programming to efficiently implement a "duplicate" or "copy" operation on modifiable resources. If a resource is duplicated but not modified, it is not necessary to create a new resource; the resource can be shared between the copy and the original. Modifications must still create a copy, hence in the technique of COW the copy operation is deferred until the first write. By sharing resources in this way, it is possible to significantly reduce the resource consumption of unmodified copies, while adding a small overhead to operations that modify resources.

Some file systems use COW technology to implement a snapshot feature. When an end user creates a snapshot, the file system does not duplicate or copy any data block in the file system when there is no write operation applied to the file system. If there is any write or modify operation for a file, the file system first determines the impacted data blocks for those write/modify operations and copies those data blocks to a newly allocated place, which belongs to the snapshot. So, the new data from write/modify operations can be written to those original data blocks, which belong to the active file system.

Exemplary Embodiments

Figure 1:
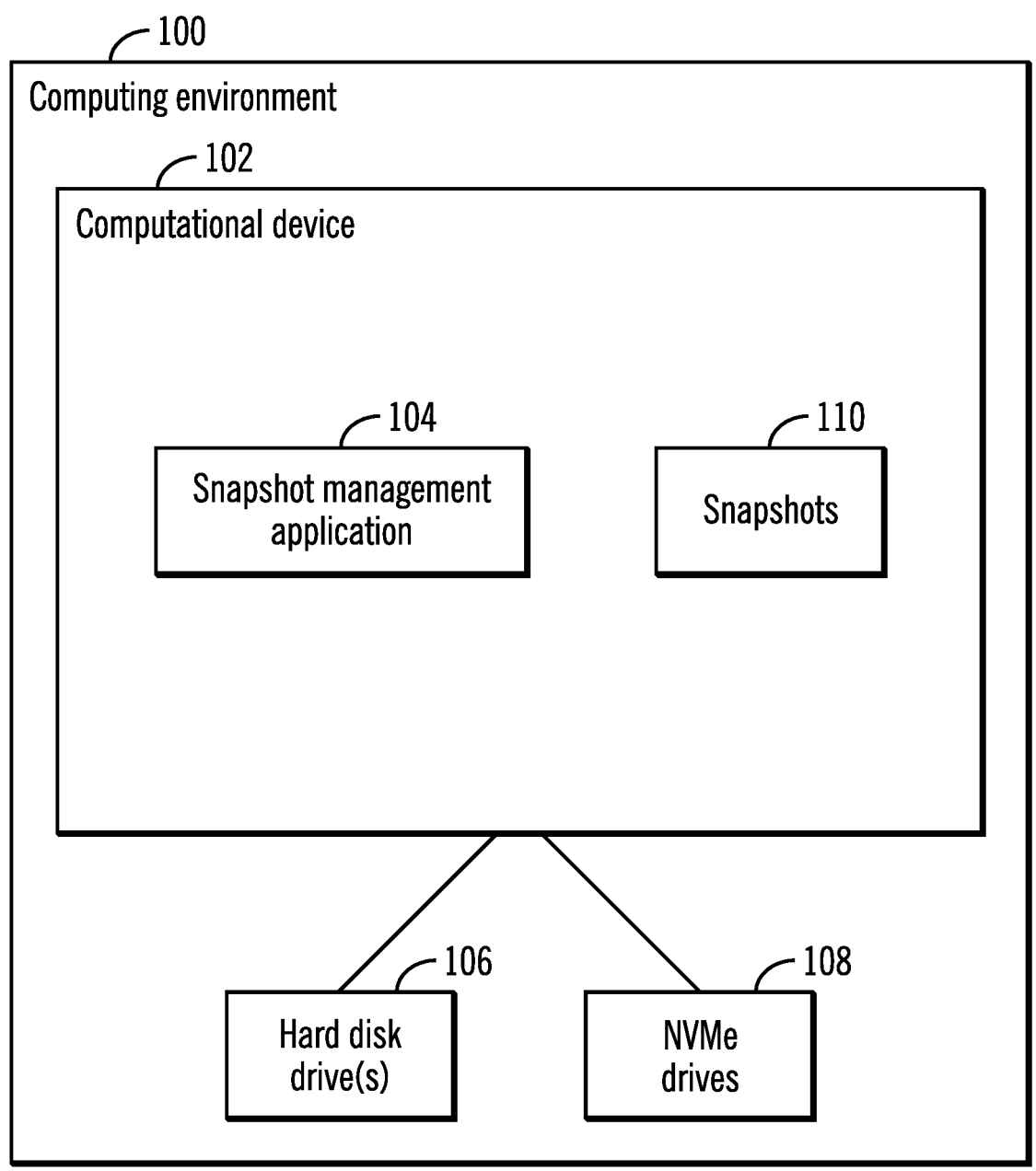
FIG. 1 illustrates a block diagram of a computing environment comprising a computational device that uses a snapshot management application to improve the performance of a file system in a hybrid storage environment, in accordance with certain embodiments.

FIG. 1 illustrates a block diagram of a computing environment 100 comprising a computational device 102 that uses a snapshot management application 104 to improve the performance of a file system in a hybrid storage environment comprising hard disk drives 106 and NVMe drives 108 in which snapshots 110 are maintained, in accordance with certain embodiments.

The computational device 102 may comprise any suitable computational device including those presently known in the art, such as, a personal computer, a workstation, a server, a mainframe, a hand held computer, a palm top computer, a telephony device, a network appliance, a blade computer, a processing device, a controller, etc.

The computational device 102 may be an element in any suitable network, such as, a storage area network, a wide area network, the Internet, an intranet, etc. In certain embodiments, the computational device 102 may be an element in a cloud computing environment.

In certain embodiments, the snapshot management application 104 may be implemented in software, firmware, hardware or any combination thereof. Instead of hard disk drives 106 and NVMe drives 108 other type of storage devices may be used ad storage coupled to the computational device 102, as long as some storage devices are relatively faster but more expensive than other storage devices. It should be noted in the example provided in FIG. 1 the NVMe drives 108 are relatively faster but have less storage capacity than the hard disk drives 106.

Figure 2:
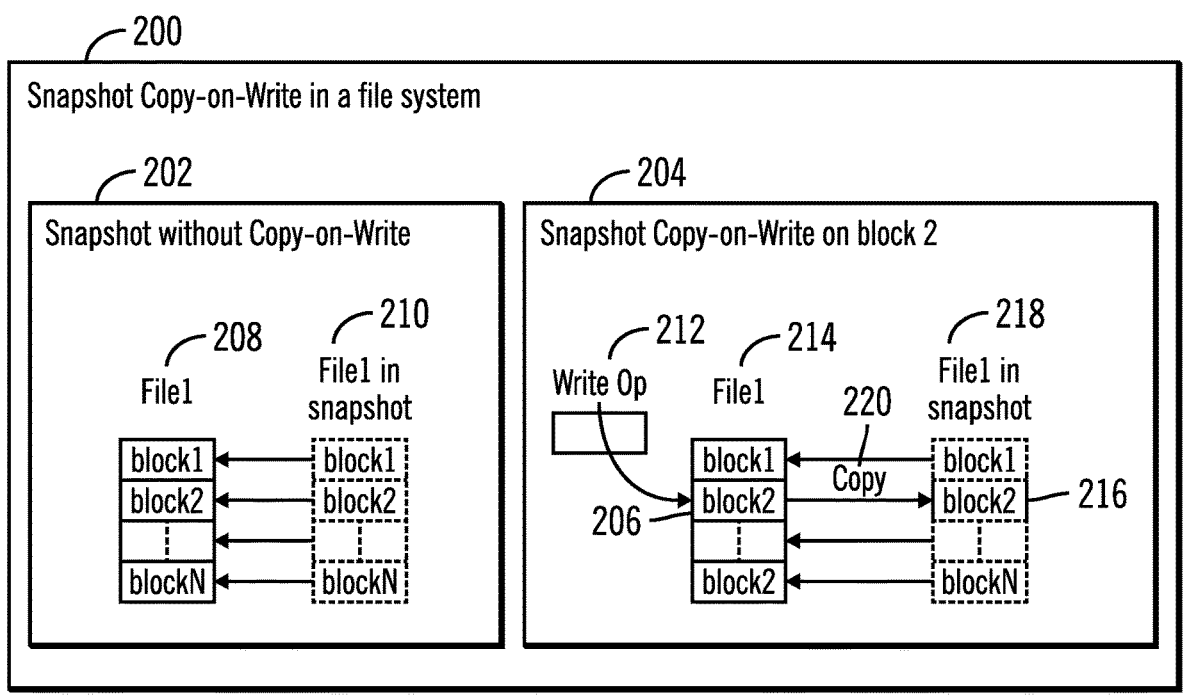
FIG. 2 illustrates a block diagram that shows a snapshot Copy-on-Write in a file system, in accordance with certain embodiments.

FIG. 2 illustrates a block diagram 200 that shows a snapshot Copy-on-Write in a file system, in accordance with certain embodiments. Block 202 shows a snapshot without Copy-on-Write and block 204 shows a snapshot Copy-on-Write on block2 (reference numeral 206).

As shown in FIG. 2, if there is no write operation for file1 (reference numeral 208), there is no actual data block in the snapshot of file1. All of data block addresses of file1 in the snapshot (reference numeral 210) are pointed to (shadow with) the data blocks in the active file system. If there is a write operation 212 for a data block for file1 214, such as block2 206, then the file system will allocate a new data block 216 for block2 of file1 in the snapshot 218 and copy data (reference numeral 220) from the active file system 214 to the snapshot 218. Then new data in the write operation can be written to data block in file1 214 in the active file system 214.

File system snapshots are a very critical feature from backup to taking local read only copy at a particular point of time. However, filesystem snapshots have an impact on the overall performance of the filesystem and eventually also on the application running over it. There are some applications that are very sensitive to performance (e.g., database) while there are some applications which are relatively less sensitive to performance (e.g., log collection). More often than not all of these applications run in separate filesets.

Snapshot with Copy-on-Write implementations gives a good storage efficiency since it only copies data block when an application start to overwrite specific data blocks. For other unchanged blocks, snapshot does not consume any data block and data block address in the snapshot also points to the data block which belongs to the active file system.

However, a snapshot Copy-on-Write implementation impacts the performance for an application which is writing data to an active file system, because for each new update blocks from the application, the file system has to allocate a new data block for the snapshot, and copy the whole data block from the active file system to the snapshot. Subsequently, new data from the write operation may be applied to the data block in the active file system. When an application writes different data blocks at the same time, this kind of data block copy impacts the performance heavily because the file system has to copy data blocks at the same time to handle write operations from the application.

To address the above and other problems, certain embodiments optimize and minimize the performance impact caused by a snapshot at least to the applications that are sensitive to performance.

In certain embodiments, there is a typical clustered filesystem sitting over hybrid set of disks types with limited NVMe disks and majority solid state drive (SSD) or hard disk drive (HDD) disks. File system data includes metadata and user data are saved in SSD/HDD disks. The limited number of NVMe disks are dedicated for snapshot performance optimization.

One of the prime reasons for snapshot performance impact is because file system needs to exercise COW (Copy-on-Write). That means after a snapshot, whenever there is a write on a block, the file system has to allocate a new block, copy the content of existing block to the new block and then execute the new write to the existing block. Note that this is a synchronized call that means both write needs to happen before the application can answer to the write operation from the application and this impacts performance.

If there is a snapshot created for a specific fileset, the required copy operation creates an additional write for every new write on this snapshotted fileset.

It is a known fact some storage types are faster in performing write operations than others. For example, a write in a NVMe disk, may be 20 to 30 times faster than a normal HDD.

Certain embodiments resolve this snapshot Copy-on-Write performance bottleneck by using limited NVMe disk storage pool to save the data block which file system plans to copy when there is a Write operation for it that has been synchronized, and then acknowledge the Write operation as soon as possible. There is a background process that checks the NVMe disk storage pool periodically to write back data block from NVMe disk storage pool to HDD/SSD storage pool for persistent storage.

Figure 3:
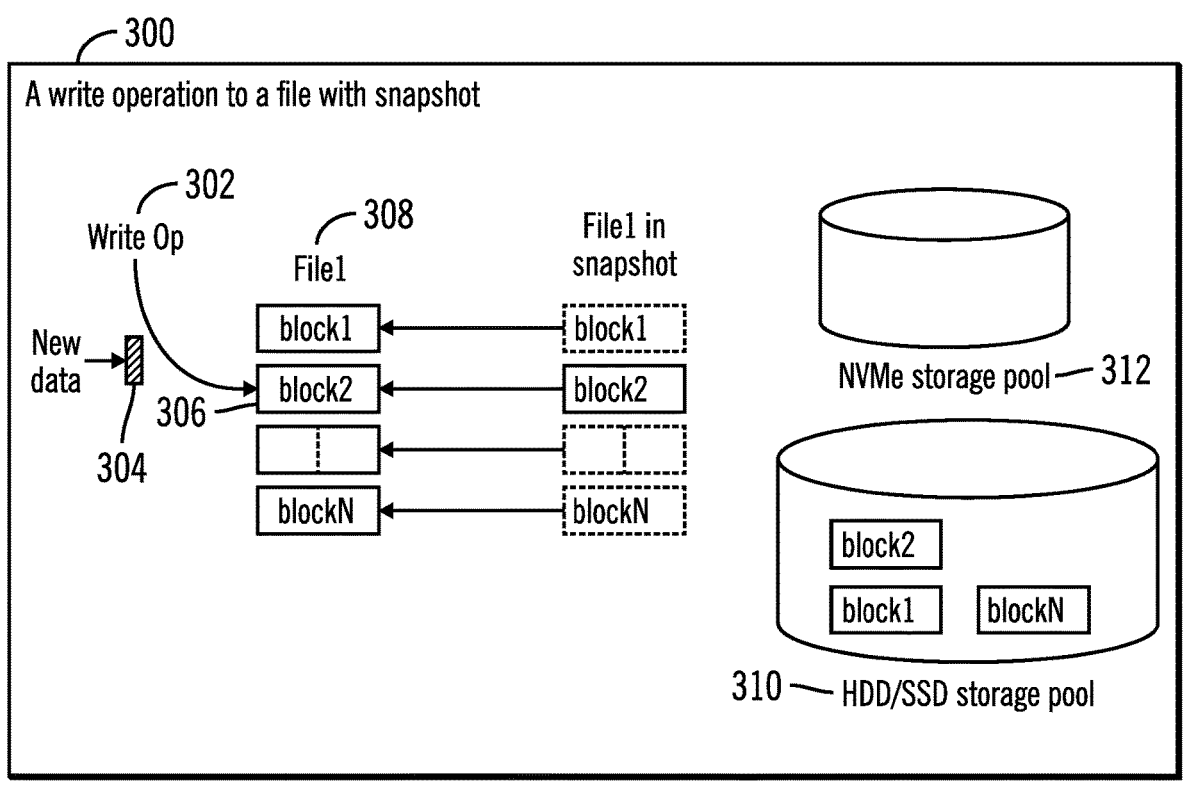
FIG. 3 illustrates a block diagram that shows a write operation to a file with snapshot, in accordance with certain embodiments.

FIG. 3 illustrates a block diagram 300 that shows a write operation to a file with snapshot, in accordance with certain embodiments.

As shown in FIG. 3, there is a Write operation 302 with new data 304 for block 2 306 in file1 308. In this time, all blocks of file1 in snapshot are the same as file1 in active file system which means there is no Copy-on-Write that has happened earlier. The blocks of File1 308 are all in the HDD/SSD storage pool 310 and not in the NVMe storage pool 312.

Figure 4:
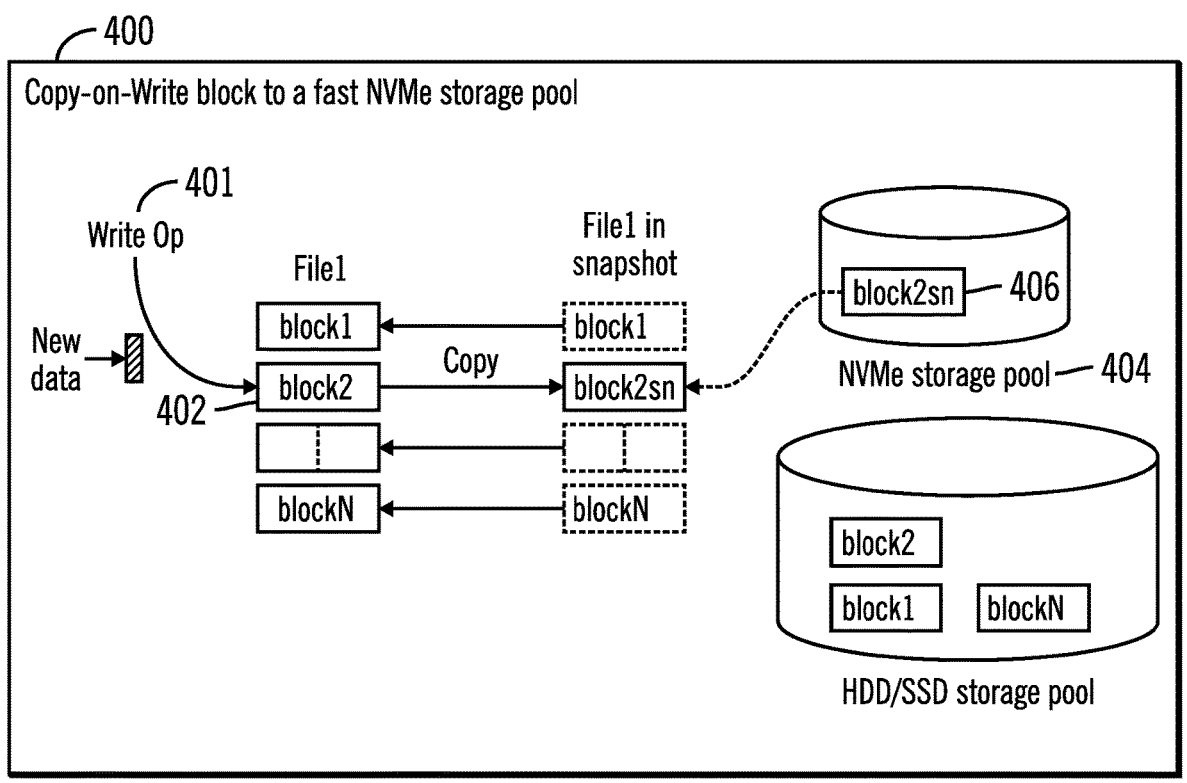
FIG. 4 illustrates a block diagram of a Copy-on-Write block saved to a fast NVMe storage pool, in accordance with certain embodiments.

FIG. 4 illustrates a block diagram 400 of a Copy-on-Write block 402 to a fast NVMe storage pool 404, in accordance with certain embodiments.

To handle the Write operation 401 for block 2 402, the file system has to copy the related data block, block2 402 in this case, to snapshot as a copy. File system allocates a new data block from fast NVMe storage pool 404, block2*sn* 406, and copies data from block2 402 to block2*sn* 406.

Figure 5:
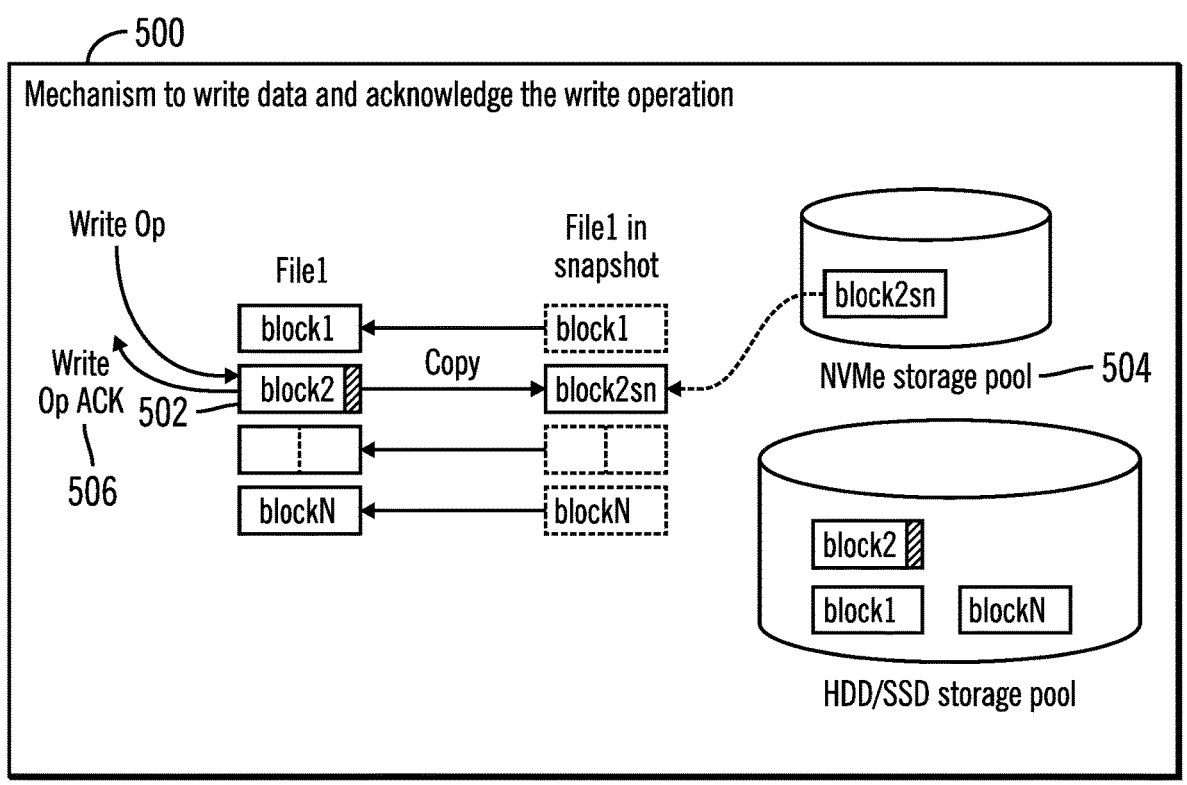
FIG. 5 illustrates a block diagram of a mechanism to write data and acknowledge the write operation, in accordance with certain embodiments.

FIG. 5 illustrates a block diagram 500 of a mechanism to write data and acknowledge the write operation, in accordance with certain embodiments.

After block2 502 has been copied to fast NVMe storage pool 504, the file system saves the new data in block2, and then acknowledges the write operation (reference numeral 506). At this time, the application gets confirmation from the file system that the Write operation has been completed.

Figure 6:
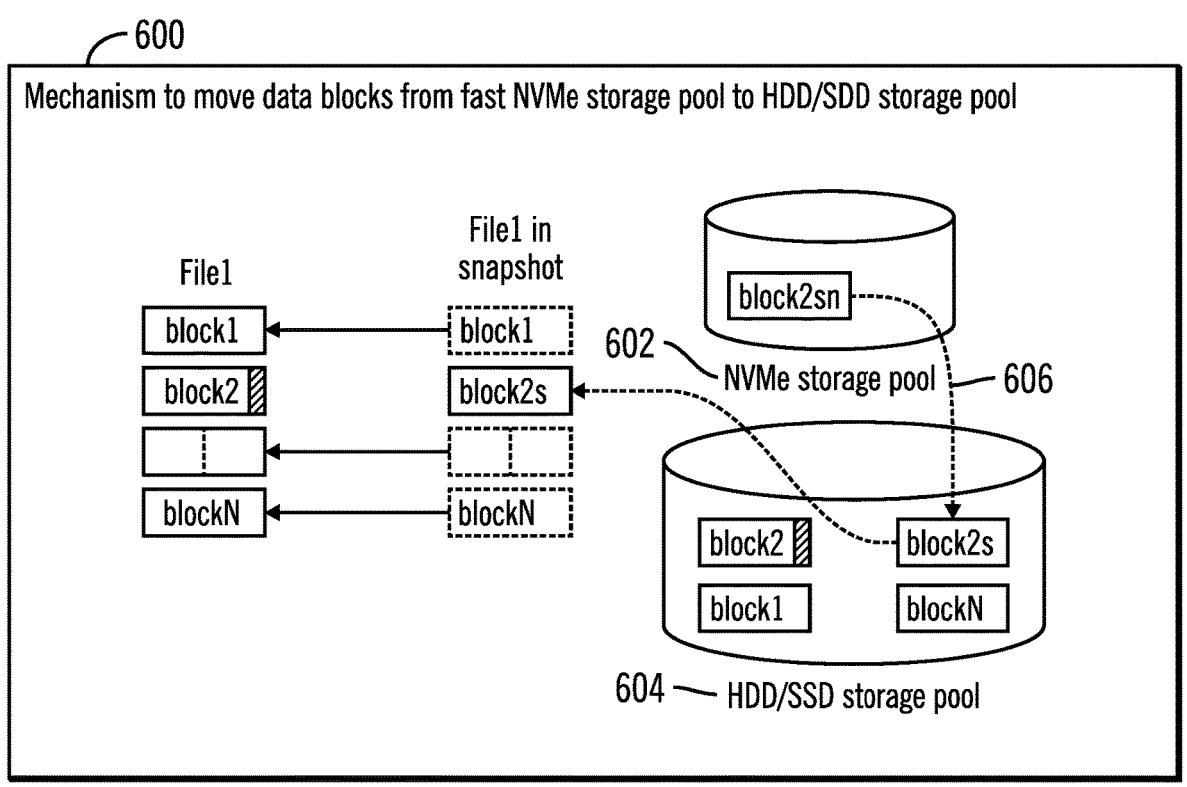
FIG. 6 illustrates a block diagram of a mechanism to move data blocks from fast NVMe storage pool to HDD/SDD storage pool, in accordance with certain embodiments.

FIG. 6 illustrates a block diagram 600 of a mechanism to move data blocks from fast NVMe storage pool 602 to HDD/SSD storage pool 604, in accordance with certain embodiments.

Since NVMe storage pool has limited storage capacity, there are a few background threads that move data blocks from NVMe storage pool 602 to HDD/SSD storage pool 604 where the movement is shown via reference numeral 606.

Figure 7:
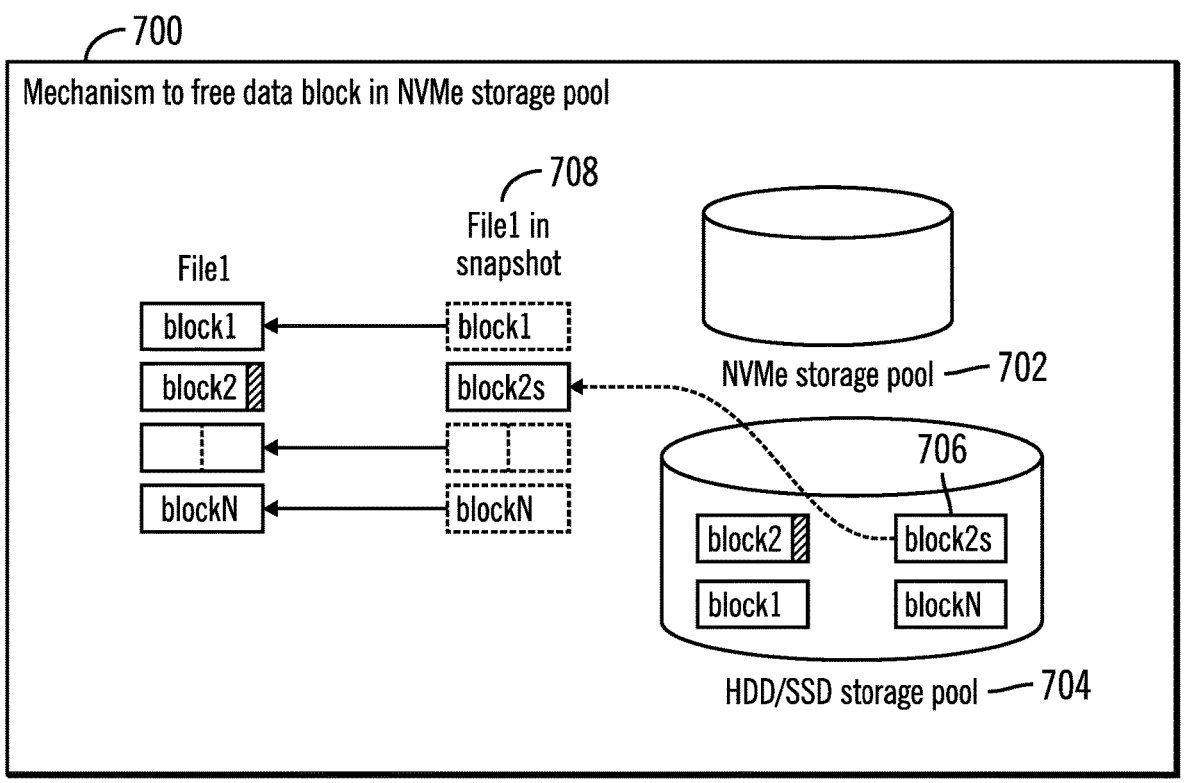
FIG. 7 illustrates a block diagram of a mechanism to free data block in NVMe storage pool, in accordance with certain embodiments.

FIG. 7 illustrates a block diagram 700 of a mechanism to free data block in NVMe storage pool 702, in accordance with certain embodiments.

After data has been moved from NVMe storage pool 702, the data block in the HDD/SSD storage pool 704, block2*s* 706 in this case, represents the data block in the snapshot 708. The File system frees the data block in NVMe storage pool 702 to release storage capacity for further arriving Write operations.

Figure 8:
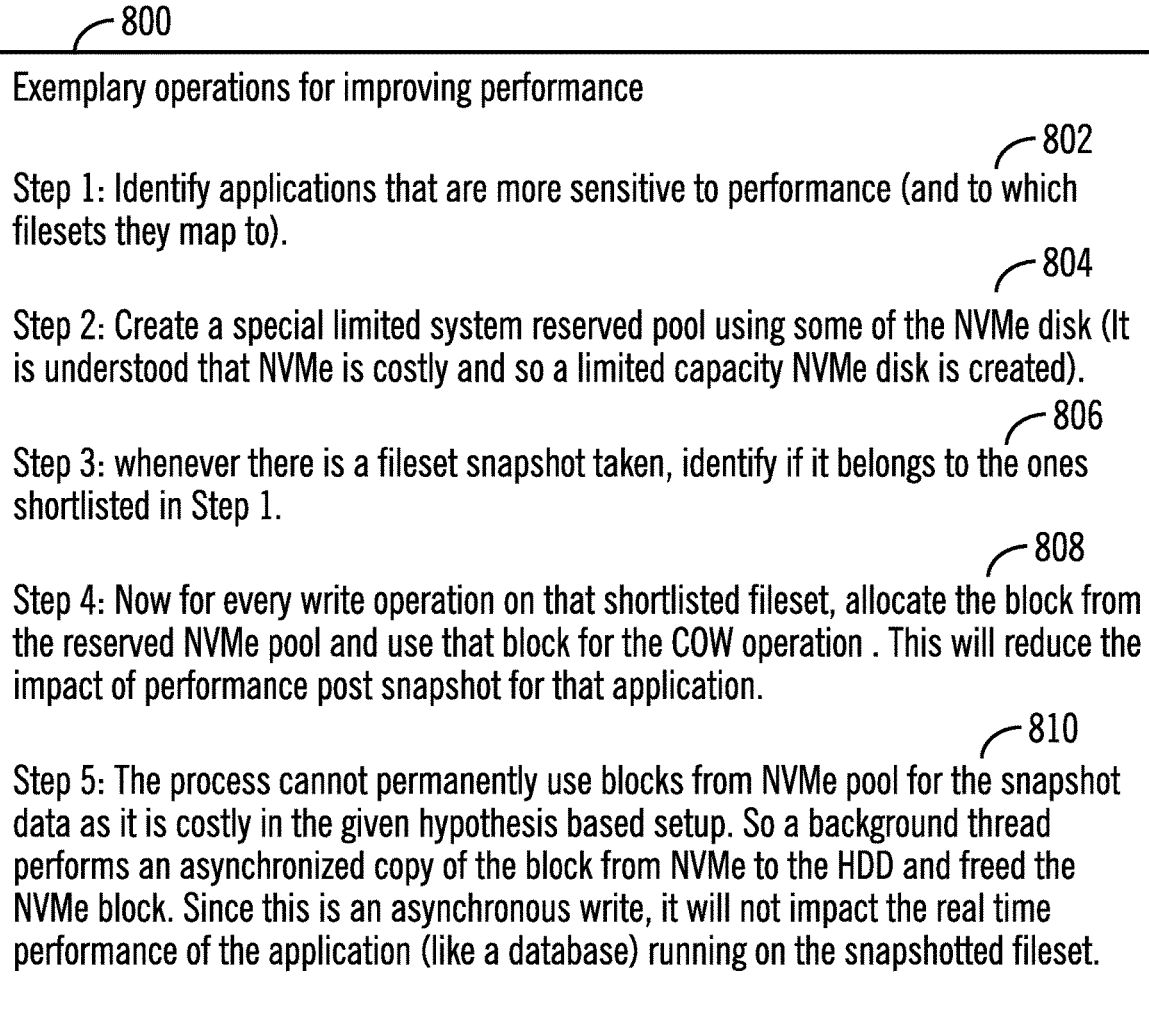
FIG. 8 illustrates a block diagram that shows operations in certain embodiments.

FIG. 8 illustrates a block diagram 800 that shows operations in certain embodiments. The steps of the operations may be the following:

Step 1: Identify application that are more sensitive to performance (and to which filesets they map to) [reference numeral 802].

Step 2: Create a special limited system reserved pool using some of the NVMe disk (It is understood that NVMe is costly and so a limited capacity NVMe disk is created) [reference numeral 804].

Step 3: whenever there is a fileset snapshot taken, identify if it belongs to the ones shortlisted in Step 1 [reference numeral 806].

Step 4: Now for every write operation on that shortlisted fileset, allocate the block from the reserved NVMe pool and use that block for the COW operation. This will reduce the impact of performance post snapshot for that application [reference numeral 808].

Step 5: The process cannot permanently use blocks from NVMe pool for the snapshot data as it is costly in the given hypothesis based setup. So a background thread performs an asynchronized copy of the block from NVMe to the HDD and freed the NVMe block. Since this is an asynchronous write, it will not impact the real time performance of the application (like a database) running on the snapshotted fileset [reference numeral 810].

Figure 9:
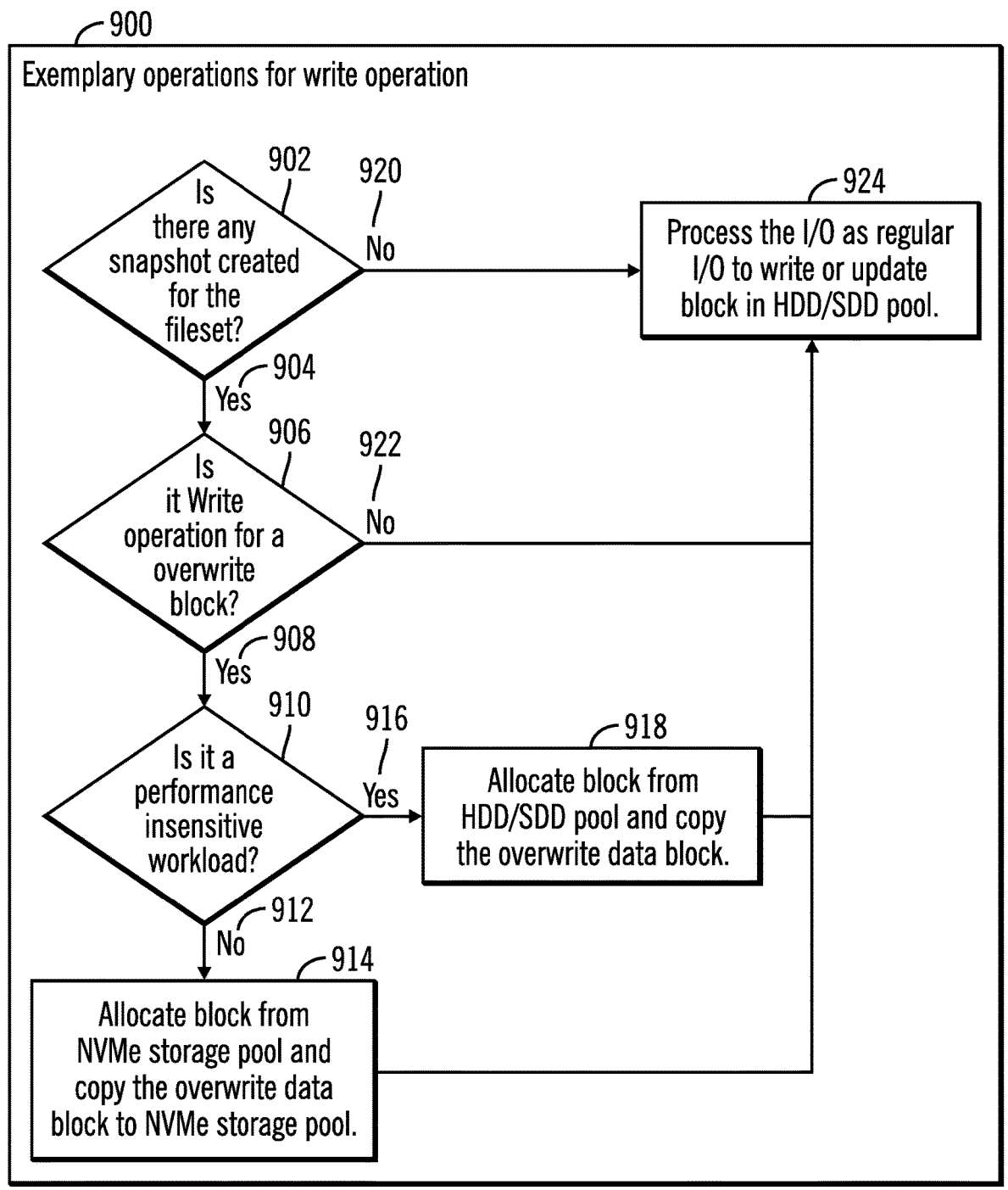
FIG. 9 illustrates a flowchart that shows a procedure for a write operation, in accordance with certain embodiments.

FIG. 9 illustrates a flowchart 900 that shows exemplary operations for a write operation, in accordance with certain embodiments. The operations shown n FIG. 9 may be performed by the snapshot management application 104 that executes in the computational device 102.

Control starts at block 902 in which a determination is made as to whether any snapshot has been created for a fileset. If so ("Y", i.e., Yes), control proceeds to block 906 in which a determination is made as to whether there is a write operation for an overwrite block. If so ("Y" 908) control proceeds block 910 in which a determination is made as to whether it is a performance insensitive workload. If not, ("N" 912) then the process allocates block from NVMe storage pool and copies the overwrite data block to NVMe storage (as shown via reference numeral 914).

If at block 910 it is determined that it is a performance insensitive workload ("Y" 916), then control proceeds block 918 in which a block is allocated from HDD/SDD pool and overwrite data block is copied to the HDD/SSD pool. If the determination leads to a No (i.e. 920, 922) in blocks 902 or 906 control proceeds to block 924 in which input/output (I/O) is processed as regular I/O to write or update a block in HDD/SSD pool.

Figure 10:
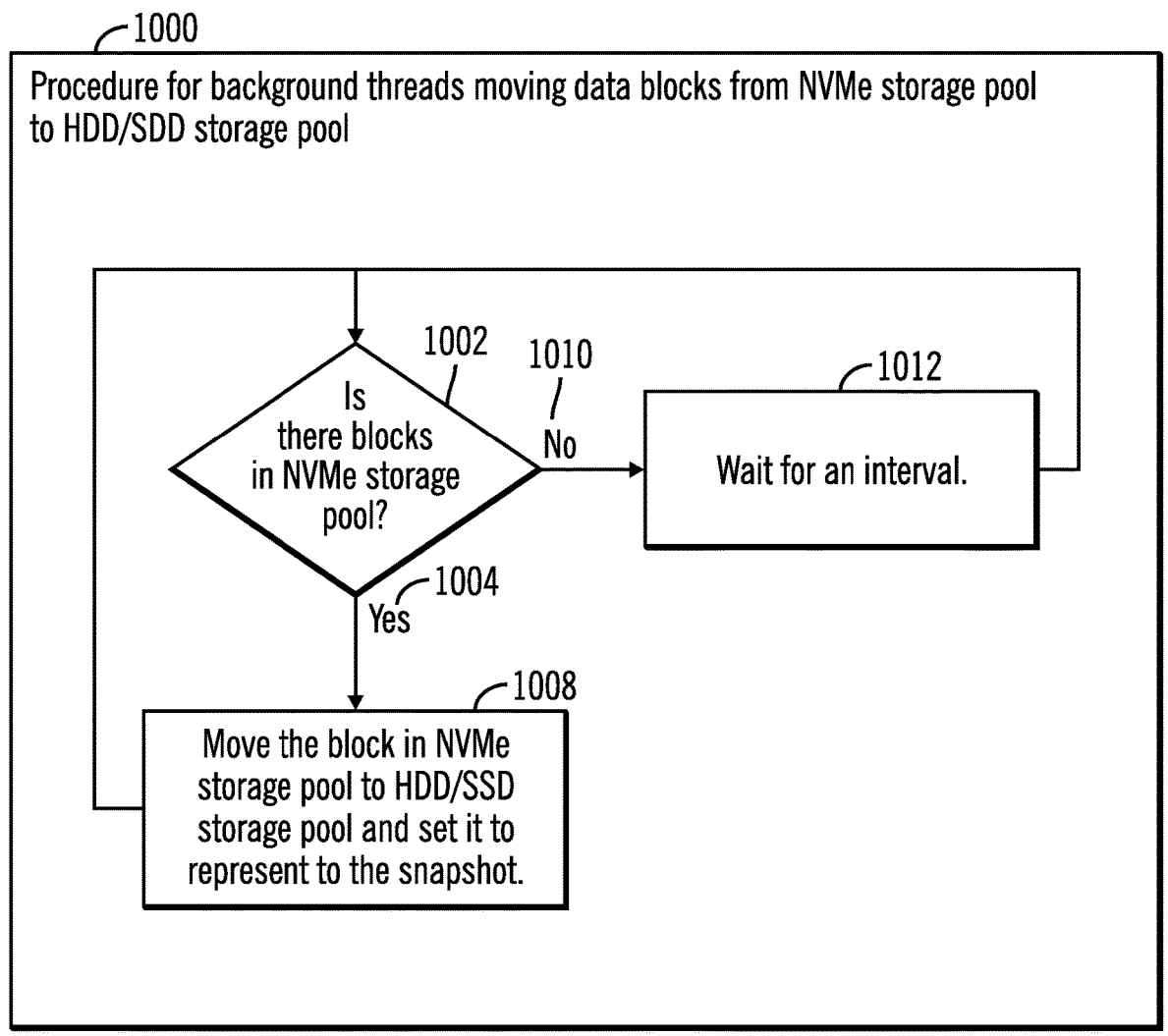
FIG. 10 illustrates a flowchart that shows a procedure for background threads moving data blocks from NVMe storage pool to HDD/SSD storage pool, in accordance with certain embodiments.

FIG. 10 illustrates a flowchart 1000 that shows a procedure for background threads moving data blocks from NVMe storage pool to HDD/SDD storage pool, in accordance with certain embodiments.

Control starts at block 1002 in which a determination is made as to whether there are blocks in the NVMe storage pool. If so ("Y" 1004), then the process moves the block in NVMe storage pool to HDD/SSD storage pool and sets it to represent to the snapshot. If not ("N" 1010), then the process waits for an interval (reference numeral 1012) before returning control to block 1008.

Figure 11:
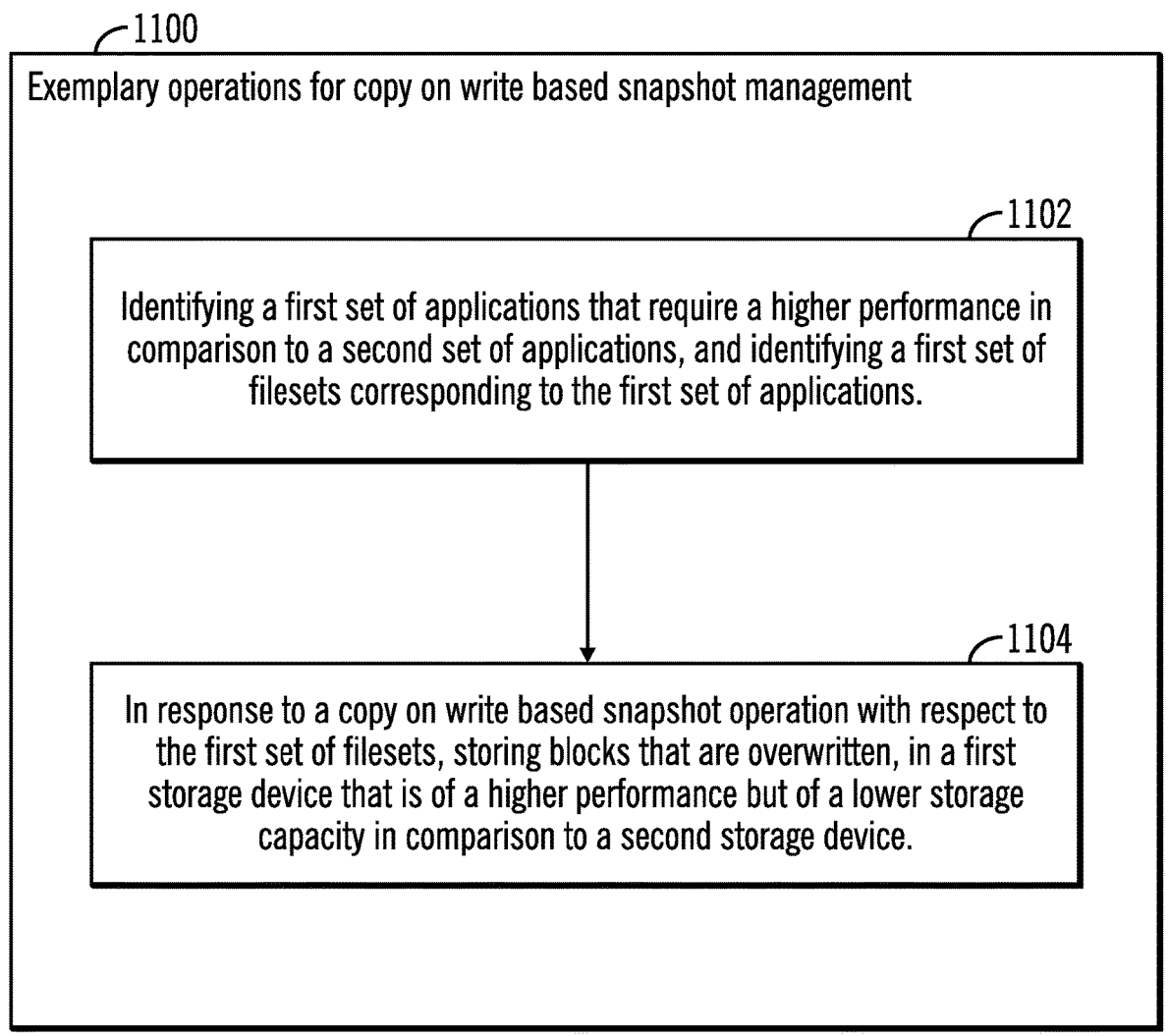
FIG. 11 illustrates a flowchart for managing a copy on write based snapshot, in accordance with certain embodiments.

FIG. 11 illustrates a flowchart 1100 for managing a copy on write based snapshot, in accordance with certain embodiments. The operations shown in FIG. 11 may be performed by the snapshot management application 104 that executes in the computational device 102.

Control starts at block 1102 in which a first set of applications that require a higher performance in comparison to a second set of applications are identified, and a first set of filesets corresponding to the first set of applications are identified. In response to a copy on write based snapshot operation with respect to the first set of filesets, blocks that are overwritten are stored (at lock 1104) in a first storage device that is of a higher performance but of a lower storage capacity in comparison to a second storage device.

Therefore FIGS. 1-11 illustrate embodiments that improve the performance of a computer system by using a process that manages copy on write operations associated with snapshot operations.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 12:
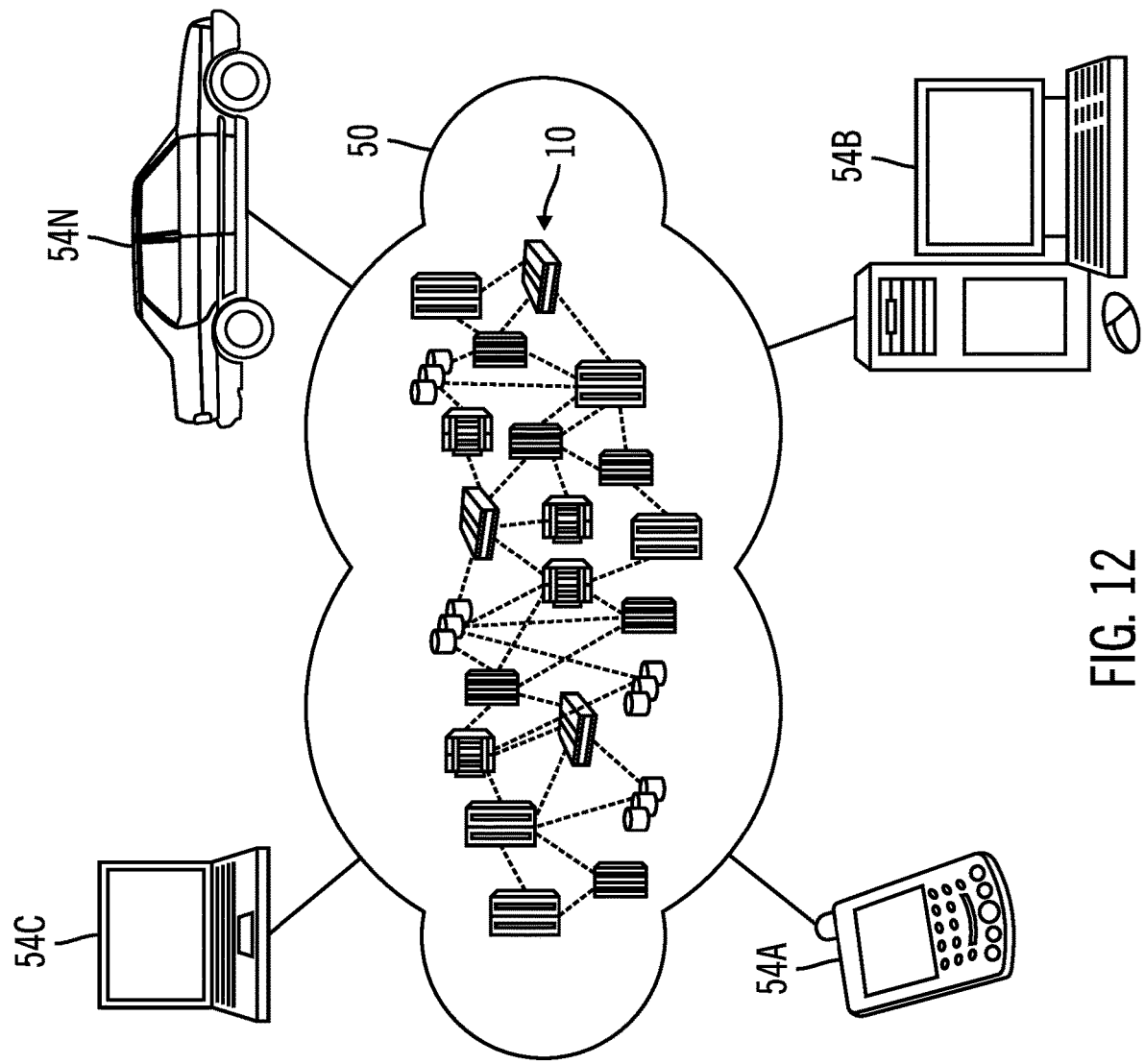
FIG. 12 illustrates a block diagram of a cloud computing environment, in accordance with certain embodiments.

Referring now to FIG. 12, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
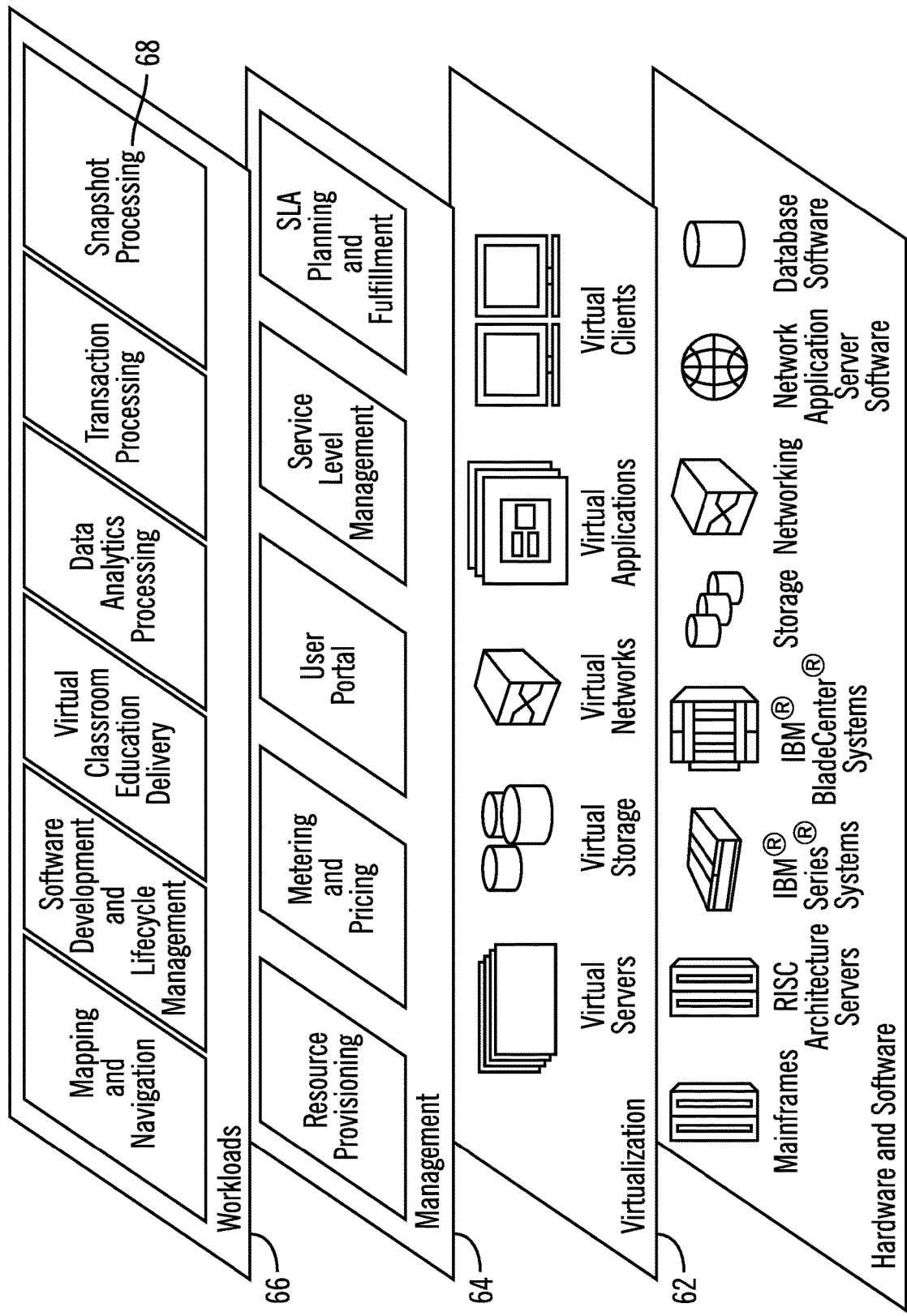
FIG. 13 illustrates a block diagram of further details of the cloud computing environment of FIG. 12, in accordance with certain embodiments.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM Web Sphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and snapshot processing 68 as shown in FIGS. 1-12.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 14:
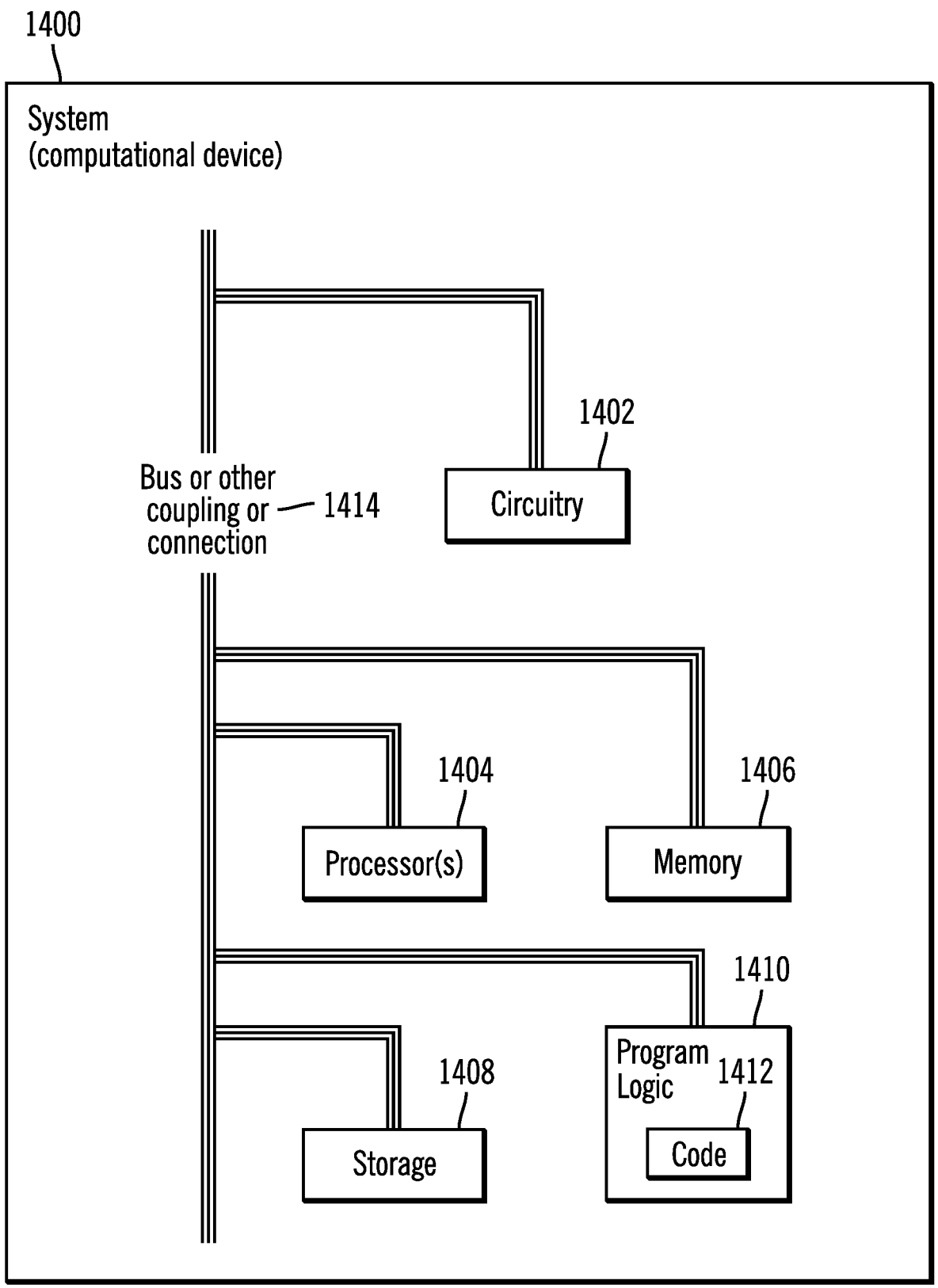
FIG. 14 illustrates a block diagram of a computational system that shows certain elements that may be included in the computational device described in FIGS. 1-13, in accordance with certain embodiments.

FIG. 14 illustrates a block diagram that shows certain elements that may be included in the computational device 102 in accordance with certain embodiments. The system 1400 may include a circuitry 1402 that may in certain embodiments include at least a processor 1404. The system 1400 may also include a memory 1406 (e.g., a volatile memory device), and storage 1408. The storage 1408 may include a non-volatile memory device (e.g., EEPROM, ROM, PROM, flash, firmware, programmable logic, etc.), magnetic disk drive, optical disk drive, tape drive, etc. The storage 1408 may comprise an internal storage device, an attached storage device and/or a network accessible storage device. The system 1400 may include a program logic 1410 including code 1412 that may be loaded into the memory 1406 and executed by the processor 1404 or circuitry 1402. In certain embodiments, the program logic 1410 including code 1412 may be stored in the storage 1408. In certain other embodiments, the program logic 1410 may be implemented in the circuitry 1402. One or more of the components in the system 1400 may communicate via a bus or via other coupling or connection 1414. Therefore, while FIG. 14 shows the program logic 1410 separately from the other elements, the program logic 1410 may be implemented in the memory 1406 and/or the circuitry 1402.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
identifying a first set of applications that require a higher performance in comparison to a second set of applications, and identifying a first set of filesets corresponding to the first set of applications, wherein a first storage device is of a higher performance in comparison to a second storage device; and
in response to a write operation on a selected fileset of the first set of filesets, performing:
determining whether a snapshot has been created for the selected fileset via a copy on write based snapshot operation;
in response to determining that no snapshot has been created for the selected fileset, processing the write operation to write on the second storage device; and
in response to determining that the snapshot has been created for the selected fileset, performing:
storing blocks that are overwritten in the selected fileset, in the first storage device; and
storing blocks that are not overwritten in the selected fileset, in the second storage device.

2. The method of claim 1, the method further comprising:
identifying a second set of filesets corresponding to the second set of applications; and
in response to a copy on write based snapshot operation with respect to the second set of filesets, storing blocks that are written onto, in the second storage device.

3. The method of claim 2, the method further comprising:
using a background process to asynchronously demote blocks from the first storage device to the second storage device for storing relatively less data on the first storage device that has lower storage capacity relative to the second storage device.

4. The method of claim 3, wherein the first storage device is a Non-volatile memory access (NVMe) storage drive, and wherein the second storage device is a hard disk drive.

5. The method of claim 1, wherein in copy on write, a storage block is not copied during replication but a link maintained to an unmodified storage block, unless the storage block is overwritten.

6. The method of claim 1, wherein an acknowledgement is provided in response to a write operation on a block, once the block has been copied to the first storage device.

7. A system, comprising:
a memory; and
a processor coupled to the memory, wherein the processor performs operations, the operations comprising:
identifying a first set of applications that require a higher performance in comparison to a second set of applications, and identifying a first set of filesets corresponding to the first set of applications, wherein a first storage device is of a higher performance in comparison to a second storage device; and
in response to a write operation on a selected fileset of the first set of filesets, performing:
determining whether a snapshot has been created for the selected fileset via a copy on write based snapshot operation;
in response to determining that no snapshot has been created for the selected fileset, processing the write operation to write on the second storage device; and
in response to determining that the snapshot has been created for the selected fileset, performing:
storing blocks that are overwritten in the selected fileset, in the first storage device; and storing blocks that are not overwritten in the selected fileset, in the second storage device.

8. The system of claim 7, the operations further comprising:
   identifying a second set of filesets corresponding to the second set of applications; and
   in response to a copy on write based snapshot operation with respect to the second set of filesets, storing blocks that are written onto, in the second storage device.

9. The system of claim 8, the operations further comprising:
   using a background process to asynchronously demote blocks from the first storage device to the second storage device for storing relatively less data on the first storage device that has lower storage capacity relative to the second storage device.

10. The system of claim 9, wherein the first storage device is a Non-volatile memory access (NVMe) storage drive, and wherein the second storage device is a hard disk drive.

11. The system of claim 7, wherein in copy on write, a storage block is not copied during replication but a link maintained to an unmodified storage block, unless the storage block is overwritten.

12. The system of claim 7, wherein an acknowledgement is provided in response to a write operation on a block, once the block has been copied to the first storage device.

13. A computer program product, the computer program product comprising a computer readable storage medium having computer readable program code embodied therewith, the computer readable program code configured to perform operations, the operations comprising:
   identifying a first set of applications that require a higher performance in comparison to a second set of applications, and identifying a first set of filesets corresponding to the first set of applications, wherein a first storage device is of a higher performance in comparison to a second storage device; and
   in response to a write operation on a selected fileset of the first set of filesets, performing:
      determining whether a snapshot has been created for the selected fileset via a copy on write based snapshot operation;
      in response to determining that no snapshot has been created for the selected fileset, processing the write operation to write on the second storage device; and
      in response to determining that the snapshot has been created for the selected fileset, performing:
         storing blocks that are overwritten in the selected fileset, in the first storage device; and
         storing blocks that are not overwritten in the selected fileset, in the second storage device.

14. The computer program product of claim 13, the operations further comprising:
   identifying a second set of filesets corresponding to the second set of applications; and
   in response to a copy on write based snapshot operation with respect to the second set of filesets, storing blocks that are written onto, in the second storage device.

15. The computer program product of claim 14, the operations further comprising:
   using a background process to asynchronously demote blocks from the first storage device to the second storage device for storing relatively less data on the first storage device that has lower storage capacity relative to the second storage device.

16. The computer program product of claim 15, wherein the first storage device is a Non-volatile memory access (NVMe) storage drive, and wherein the second storage device is a hard disk drive.

17. The computer program product of claim 13, wherein in copy on write, a storage block is not copied during replication but a link maintained to an unmodified storage block, unless the storage block is overwritten.

18. The computer program product of claim 13, wherein an acknowledgement is provided in response to a write operation on a block, once the block has been copied to the first storage device.

\* \* \* \* \*